US008190310B2

(12) United States Patent
Coulmeau et al.

(10) Patent No.: US 8,190,310 B2
(45) Date of Patent: May 29, 2012

(54) METHODS OF OPTIMIZING THE LOCATION OF AN AIRCRAFT ON THE GROUND AND IN THE TAKE-OFF AND LANDING PHASES

(75) Inventors: François Coulmeau, Seilh (FR); Nicolas Marty, Saint Sauveur (FR); Alain Cordonnier, Pompignac (FR)

(73) Assignee: Thales (FR)

( * ) Notice: Subject to any disclaimer, the term of this patent is extended or adjusted under 35 U.S.C. 154(b) by 652 days.

(21) Appl. No.: 12/366,667

(22) Filed: Feb. 6, 2009

(65) Prior Publication Data
US 2009/0201197 A1 Aug. 13, 2009

(30) Foreign Application Priority Data

Feb. 8, 2008 (FR) ...................................... 08 00674

(51) Int. Cl.
*G06G 7/70* (2006.01)
(52) U.S. Cl. .................. 701/15; 701/16; 342/357.31
(58) Field of Classification Search .................. 701/3, 8, 701/15–17; 342/357.02, 357.23, 357.28, 342/357.31
See application file for complete search history.

(56) References Cited

U.S. PATENT DOCUMENTS

| 4,806,940 | A  | * | 2/1989  | Harral et al. ............... 342/451 |
| 5,361,212 | A  | * | 11/1994 | Class et al. ................. 701/16 |
| 5,375,058 | A  | * | 12/1994 | Bass ........................... 701/120 |
| 5,786,773 | A  | * | 7/1998  | Murphy ...................... 340/947 |
| 7,546,183 | B1 | * | 6/2009  | Marcum ...................... 701/17 |
| 7,715,955 | B2 | * | 5/2010  | Tatham et al. ............... 701/16 |
| 7,933,714 | B2 | * | 4/2011  | Fetzmann et al. ............ 701/208 |
| 2004/0044446 | A1 |   | 3/2004  | Staggs |
| 2004/0239560 | A1 | * | 12/2004 | Coatantiec et al. ...... 342/357.14 |
| 2007/0129855 | A1 |   | 6/2007  | Coulmeau |
| 2007/0219678 | A1 |   | 9/2007  | Coulmeau |
| 2007/0219679 | A1 |   | 9/2007  | Coulmeau |
| 2008/0161982 | A1 |   | 7/2008  | Coulmeau et al. |
| 2008/0162092 | A1 |   | 7/2008  | Coulmeau et al. |
| 2008/0172149 | A1 | * | 7/2008  | Rouquette et al. .............. 701/16 |
| 2008/0177432 | A1 |   | 7/2008  | Deker et al. |
| 2008/0243316 | A1 |   | 10/2008 | Sacle et al. |
| 2008/0255715 | A1 | * | 10/2008 | Elchynski ...................... 701/16 |
| 2008/0294304 | A1 |   | 11/2008 | Coulmeau |
| 2008/0300738 | A1 |   | 12/2008 | Coulmeau et al. |

(Continued)

FOREIGN PATENT DOCUMENTS

EP 0678841 A1 10/1995

(Continued)

*Primary Examiner* — Joseph C Rodriguez
(74) *Attorney, Agent, or Firm* — Lowe Hauptman Ham & Berner, LLP

(57) ABSTRACT

The present invention relates to the field of methods and systems for optimizing the locating of an aircraft in airports and, more particularly, in the take-off and landing phases, and notably in the air-ground and ground-air transition phases. The method of optimizing the locating of an aircraft during the take-off or landing phase comprising a transition step (21), the latter being defined between two events (A0, AS), the first event being a condition of contact between the aircraft and the runway and the second event being a threshold condition defining a stabilized flight phase, is wherein the transition step (21) comprises the determination of at least one "transition position" of the aircraft by a weighting between the "ground position" (LOC_SOL) determined by the ground locating system and the "flight position" (LOV_VOL) determined by the in-flight locating system.

20 Claims, 4 Drawing Sheets

U.S. PATENT DOCUMENTS

| | | |
|---|---|---|
| 2008/0300739 A1 | 12/2008 | Coulmeau et al. |
| 2008/0312779 A1 | 12/2008 | Sacle et al. |
| 2009/0018713 A1 | 1/2009 | Coulmeau et al. |
| 2009/0128405 A1* | 5/2009 | Fetzmann et al. ....... 342/357.09 |
| 2011/0106345 A1* | 5/2011 | Takacs et al. .................. 701/17 |

FOREIGN PATENT DOCUMENTS

WO  2007086899 A2  8/2007

* cited by examiner

METHODS OF OPTIMIZING THE LOCATION OF AN AIRCRAFT ON THE GROUND AND IN THE TAKE-OFF AND LANDING PHASES

RELATED APPLICATIONS

The present application is based on, and claims priority from, French Application Number 0800674, filed Feb. 8, 2008, the disclosure of which is hereby incorporated by reference herein in its entirely.

TECHNICAL FIELD

The present invention relates to the field of methods and systems for optimizing the locating of an aircraft in airports and, more particularly, in the take-off and landing phases, and notably in the air-ground and ground-air transition phases.

BACKGROUND OF THE INVENTION

Nowadays, in most aircraft, the calculation of the aeroplane position is performed on the basis of a ground locating system for the airport rolling phases and an in-flight locating system for take-off, landing and cruising flight.

With respect to the ground locating system, generally the latter is handled by a computer, of FMS type, the acronym signifying "Flight Management System". In particular, the computer fulfils the flight plan display, computation and aeroplane position display functions.

With respect to the ground locating system, generally the latter is handled by another computer, in certain cases called ANS, the acronym standing for "Airport Navigation System". The latter fulfils the aeroplane map display, computation and ground position display functions.

These two locating systems are nowadays independent inasmuch as they are interfaced with other equipment or systems incorporating sensors that are different depending on whether the aircraft is in the rolling, take-off, stabilized flight or landing phase. Notably, the dynamic aeroplane parameters and the contextual navigation parameters (obstacles, weather, runways, traffic) can differ according to one or other of the navigation systems.

When rolling, the longitudinal speeds are low and can be zero, when stopped, or even negative, in a so-called "push-back" reversing manoeuvre, the lateral speeds are almost zero, except when turning.

Currently, the accuracy of the ground locating systems is of the order of a metre for the rolling phases.

The ground locating system during the rolling phase generally uses sensors of GPS or IRS type, IRS standing for "Inertial Reference System". This locating system is often coupled, in the airports, with a precision local augmentation system of GBAS type, the acronym standing for "Ground-based augmentation system". The latter system makes it possible to more accurately locate the aircraft thanks to an error correction done on the ground.

Moreover, this information can be tallied with information originating from antennas fixed to the ground at known positions capable of fixing the aircraft by multilateration. In certain cases, cameras make it possible to view the markings on the ground or even to know the number of turns of the wheels of the landing gears for example.

The ground locating system can also take into account data obtained from the dynamics of the aircraft originating from sensors placed on the braking system or even on the landing gears for example.

In flight, the longitudinal speeds are high, generally above 100 knots, the lateral speed depends on the wind, and can reach 250 knots, and finally the vertical speed is non-zero.

Currently, the accuracies of the in-flight locating systems are of the order of 200 m in approach and greater than a kilometre when cruising.

The in-flight locating system uses, to fix the positioning of the aircraft, mainly equipment comprising sensors of IRS or GPS type and a regional augmentation system of SBAS type, the acronym standing for "Satellite-based augmentation system". The latter system makes it possible to locate with greater accuracy the aircraft thanks to an error correction made by satellites.

In some cases, it is possible for such equipment to be coupled with a local augmentation system of GBAS type such as an approach configuration for landing.

The in-flight locating system can also use equipment picking up the signals from the radio navigation beacons of VOR or DME type, the acronym DME standing for "Distance Measurement Equipment".

Nowadays, the in-flight locating systems are more accurate than the ground locating systems when the aircraft is in flight and conversely the ground locating systems are more accurate than the in-flight locating systems when the aircraft is on the ground.

The two systems can be used in any configuration of the aircraft, on the ground or in flight. Generally, the system used is that of the most appropriate context of the aircraft. In other words, in the rolling phase, the crew selects the ground locating system and in the flight phase, of cruising flight type, the crew selects the in-flight locating system.

However, there is a problem in the transitional take-off and landing phase during the changeover from one locating system to the other in which the accuracies of the locating systems do not allow for a continuous changeover of the position of the aircraft. This problem causes trouble for the crew, notably for the display of the aeroplane position when there is a changeover between the display of the airport map and the display of the flight plan.

Moreover, in the take-off phase, there is a problem associated with the offset between the theoretical position, called the designated take-off point, and the actual position of the aircraft on the runway just before throttle-up.

This problem is caused either by the uncertainty concerning the position of the aircraft on the runway relative to the theoretical point, or from an access to the runway via an access ramp not originally planned, a change having been made during the rolling phase. Currently, the crew is responsible for modifying the offset manually in the onboard computer in order to resolve the difference between the theoretical position and the actual position of the aircraft on the runway.

One aim of the invention is to overcome the abovementioned drawbacks.

SUMMARY OF THE INVENTION

The invention proposes a method of optimizing the calculation of the position of the aircraft in all the take-off phases, that is, from its stopping point, just before throttle-up, to a point in the flight plan at which the flight is considered stabilized. Moreover, the invention makes it possible to optimize the calculation of its position in the landing phase.

The invention makes it possible to implement a method, in the air-ground and ground-air transition phases, of hybrid calculation between its position measured on the basis of an in-flight locating system and its position measured on the basis of a ground locating system.

Advantageously, the method of optimizing the locating of an aircraft during the take-off or landing phase comprising a transition step, the latter being defined between two events (A0, AS), the first event being a condition of contact between the aircraft and the runway and the second event being a threshold condition defining a stabilized flight phase, wherein the transition step comprises the determination of at least one "transition position" of the aircraft by a weighting between the "ground position" determined by the ground locating system and the "flight position" determined by the in-flight locating system.

Advantageously, a first step, at the moment of throttle-up, comprises the determination of at least one position of the aircraft by the onboard computer, denoted "starting position"; a second step (20) preceding the transition step, when the aircraft accelerates, comprises the calculation of at least one "ground position" of the aircraft by the ground locating system; a final step (22) following the transition step, beyond the threshold condition (AS), comprises the determination of at least one "flight position" of the aircraft by the in-flight locating system.

Advantageously, a preliminary step, preceding the transition step, comprises the calculation of a threshold position of the aircraft, beyond which the position of the aircraft is calculated in a hybrid manner; a landing step, following the transition step, when the aircraft is in contact with the runway, comprises the calculation of at least one "ground position" of the aircraft by the ground locating system.

Advantageously, the first step comprises the automatic realigning of the "starting position" in the onboard computer based on a calculation of the difference measured between the designated take-off point, denoted "theoretical take-off position", and the actual position of the aircraft obtained, just before throttle-up, by the ground locating system.

Advantageously, the "take-off position" is determined by the designation, in the onboard computer, of an element of the airport database, the designation being produced in preparation of the flight by the crew.

Advantageously, the first event used to calculate the position of the aircraft in the transition step is triggered for a change of altitude of the aircraft.

Advantageously, the first event is triggered for a change of pressure on the aircraft landing gears.

Advantageously, in a first embodiment, the threshold condition is validated by a crossed altitude threshold.

Advantageously, in a second embodiment, the threshold condition is validated by a crossed rolling threshold.

Advantageously, in a third embodiment, the threshold condition is validated by a predetermined duration.

Advantageously, a "transition position" in the transition phase is calculated on the basis of a percentage of the first position (PCT_ROU) and a percentage of the second position (PCT_VOL).

Advantageously, the latitude of the aircraft, in the transition phase, is determined by the relation:

$$\text{Lat(aircraft)} = [\text{PCT\_VOL} \cdot \text{Lat\_VOL}] + [(100 - \text{PCT\_VOL}) \cdot \text{Lat\_ROU}],$$

in which the latitude calculated on the basis of the ground locating system is denoted Lat_ROU and the latitude calculated on the basis of the in-flight locating system is denoted Lat_VOL and in which PCT_VOL represents the percentage of the weighting of the position obtained from the in-flight locating system.

Advantageously, the longitude of the aircraft, in the transition phase, is determined by the relation:

$$\text{Long(aircraft)} = [\text{PCT\_VOL} \times \text{Long\_VOL}] + [(100 - \text{PCT\_VOL}) \times \text{Long\_ROU}],$$

in which the longitude calculated on the basis of the ground locating system is denoted Long_ROU and the latitude calculated on the basis of the in-flight locating system is denoted Long_VOL, and in which PCT_VOL represents the percentage of the weighting of the position obtained from the in-flight locating system.

Advantageously, the percentage of the first position (PCT_ROU) and the percentage of the second position (PCT_VOL) are determined on the basis of an altitude-dependent linear relation.

Advantageously, the latitude and the longitude of the current position of the aircraft are determined by the following relations:

$$\text{LAT(Aeroplane)} = \frac{ALT(AS) - ALT(\text{aeroplane})}{ALT(AS)} \cdot \text{LAT\_ROU} + \frac{ALT(\text{aeroplane})}{ALT(AS)} \cdot \text{LAT\_VOL},$$

$$\text{LONG(Aeroplane)} = \frac{ALT(AS) - ALT(\text{aeroplane})}{ALT(AS)} \cdot \text{LONG\_ROU} + \frac{ALT(\text{aeroplane})}{ALT(AS)} \cdot \text{LONG\_VOL}$$

in which ALT(AS) is the altitude at the point from which the position of the aircraft is entirely calculated on the basis of the in-flight locating system and LAT(aeroplane) is the current altitude of the aircraft.

Advantageously, the percentage of the first position (PCT_ROU) and the percentage of the second position (PCT_VOL) are determined on the basis of a time-dependent linear relation.

Advantageously, the latitude and the longitude of the current position of the aircraft are determined by the following relations:

$$\text{LAT(Aeroplane)} = \frac{Ts - T(\text{aeroplane})}{Ts - T0} \cdot \text{LAT\_ROU} + \frac{T(\text{aeroplane}) - T0}{Ts - T0} \cdot \text{LAT\_VOL},$$

$$\text{LONG(Aeroplane)} = \frac{Ts - T(\text{aeroplane})}{Ts - T0} \cdot \text{LONG\_ROU} + \frac{T(\text{aeroplane}) - T0}{Ts - T0} \cdot \text{LONG\_VOL},$$

in which Ts is the time of passage at the point from which the position of the aircraft is entirely calculated on the basis of the in-flight locating system, T0 is the time of passage when the aircraft leaves the runway and T(aeroplane) is the local time of the aircraft.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The invention makes it possible to optimize the calculation of the position of the aircraft notably by a first method corresponding to the take-off phase and a second method corresponding to the landing phase, the inventive concepts of the two methods being the same.

During the take-off phase, a first method according to the invention comprises several steps.

A first step of the first method consists in automatically readjusting, before throttle-up, the theoretical take-off position in the onboard computer. The theoretical take-off position is generally designated on preparation of the flight by the crew.

In the preparation of the flight generally performed in the parking area, the pilot initializes, through the onboard computer, the inertial units and the current position of the aircraft. The crew has to select an access ramp to the runway or at least one element of the airport database in order to define the runway entry point.

The take-off comprises a rolling phase and a flight phase. The rolling of the aircraft prior to take-off proceeds from the initialization of the flight until the moment when the aircraft leaves the runway.

The rolling itself comprises a first rolling phase of the initialization of the flight until the moment of throttle-up and an acceleration phase on the runway between throttle-up and the moment when the aircraft leaves the runway.

The method according to the invention makes it possible to establish in this first step an automatic realigning in the computer of the take-off position actually measured based on the ground locating system.

Figure 1A:
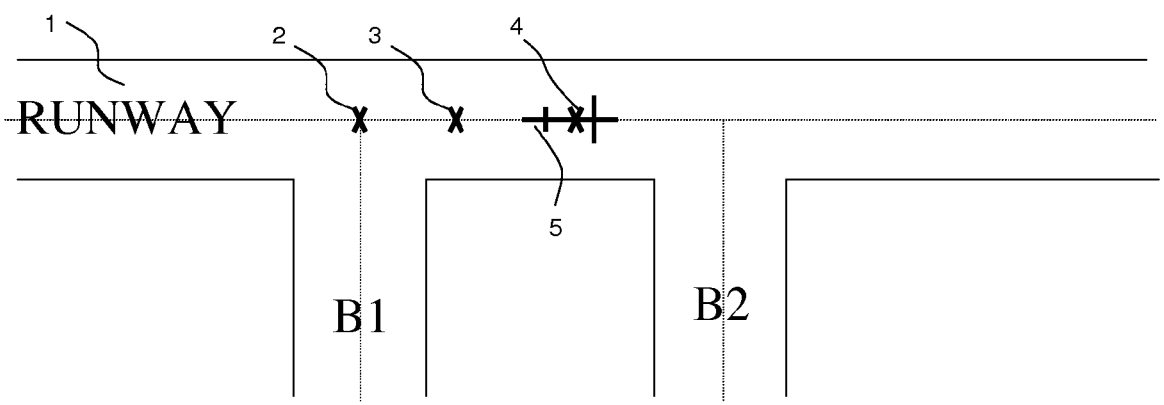
FIG. 1A: a diagram of the data making it possible to implement the first step of the first method according to the invention.

FIG. 1A represents a schematic view of a runway 1 and of two access ramps B1, B2. In the example of FIG. 1A, the crew has previously selected ramp B1 so as to be positioned on the theoretical take-off position 3.

From the airport database and the selected element B1, the computer determines the point of intersection 2 of the ramp B1 and the runway 1 and the theoretical take-off point 3.

The theoretical take-off point of the runway generated by the computer is situated at a distance from the point of intersection 2 calculated so that the aircraft can perform its final turning before the take-off and be positioned facing the runway. This final point of the runway generated in this way from the selection of the element by the crew is called the "theoretical take-off point".

In reality, the aircraft is rarely exactly placed at the theoretical take-off point generated by the computer, and can be more or less offset from this position. In the example of FIG. 1A, the aircraft is situated at a position 4 when stopped and is ready for throttling-up.

The invention makes it possible, based on the ground locating system, to measure the actual position 4 of the aircraft and automatically update this actual take-off position in the computer so that this final value replaces the theoretical position 3.

The calculation of this offset is performed from the computer and the database of the airport elements which comprises the coordinates and the geometrical shapes, notably of the runways, of the runway thresholds, of the runway axes, of the access ramps, of the access ramp axes, of the intersections between the taxiways and the runways and the intersections between runways themselves, and of the specific markings on the runways.

The theoretical take-off point generated in this way following the selection of an element by the crew is the point of the take-off runway that presents the highest probability of the aircraft being positioned there. The aircraft has previously used the element of the airport selected by the crew.

For this, a mapping rule associates an element of the database of airport elements with a determined point of the runway that is optimal for the take-off, i.e. the theoretical take-off point.

In the phase of positioning of the aircraft on the take-off runway, the onboard computer detects at regular intervals if the aircraft is in the take-off situation, generally the aircraft is stopped in this situation and the crew is preparing to throttle up. This final situation is recorded by a condition, denoted take-off condition.

When the take-off condition is validated, the deviation between the theoretical take-off position and the actually measured position of the aircraft by the ground locating system is measured. When the value of the measured deviation is situated above a tolerance threshold, the computer realigns the position of the aircraft on the actually measured position. Below the threshold, the value of the theoretical take-off position is maintained in the computer.

Figure 1B:
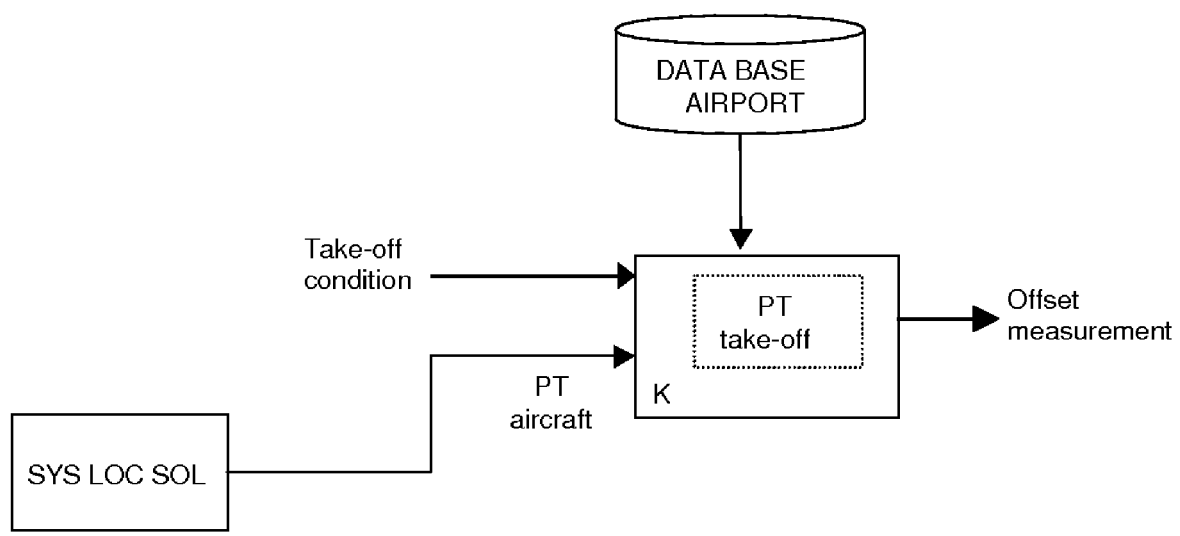
FIG. 1B: a diagram illustrating the principle of realigning of the positioning of an aircraft on a take-off runway according to the first inventive method.

FIG. 1B represents a Computer K, such as an ANS, having calculated a take-off point "PT_take-off" from the selection, by the crew, of an element of the airport database, called "database airport" in FIG. 1B.

The method according to the invention therefore makes it possible to compare the position of the take-off point PT_take-off with the current position of the aircraft, the latter being measured on the basis of the ground locating system.

The current position, measured by the ground locating system SYS_LOC_SOL, is accompanied by an uncertainty margin linked to the context of the aircraft and to the locating system.

If the "take-off" condition is validated, that is, the aircraft is stopped and the throttling-up can be performed, then, according to the value of the difference of the measured positions between the take-off point and the current position of the aircraft, an automatic realignment of the take-off point is performed in the FMS, an offset generally called "take-off shift". This realignment makes it possible to update the computer so that the initial take-off point is a correct point supplied to the in-flight locating system.

The automatic realignment of the take-off position is carried out for a value of the difference of the measured positions that exceeds a predetermined threshold. This final threshold value takes into account the uncertainty margins measured by the aircraft position detection equipment.

The second step of the method is performed in the acceleration phase of the aircraft on the take-off runway between the moment of throttling-up and the moment when the aircraft leaves the runway and is no longer in contact with the runway.

In this step, the position of the aircraft is entirely measured from the ground locating system, the latter being handled by a system of sensors of GPS and/or IRS type with a local augmentation system of GBAS type and possibly using a multilateration based on antennas fixed to the ground, the positions of which are known.

Figure 2:
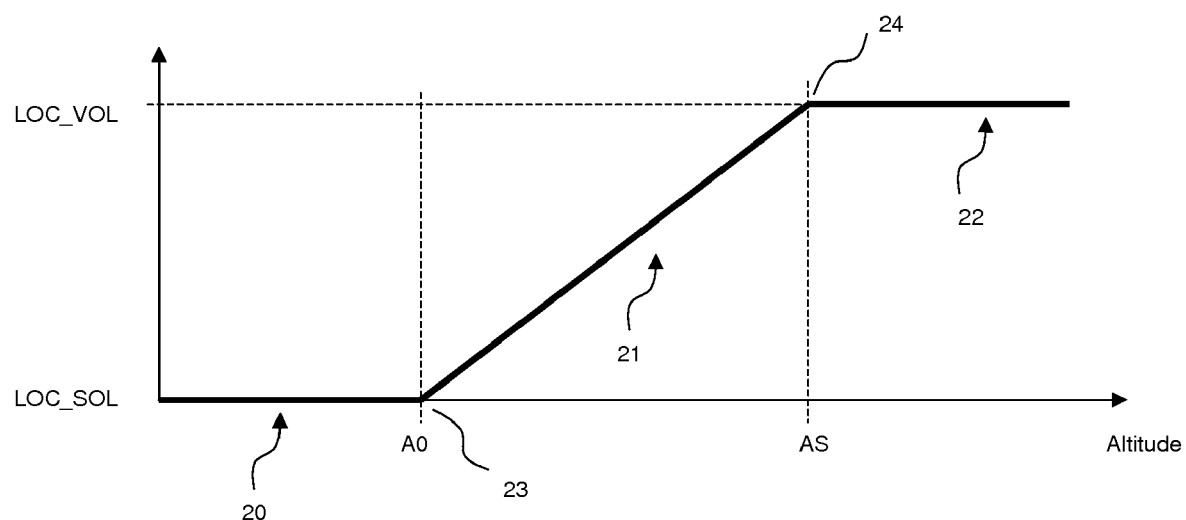
FIG. 2: an example of hybridization of the locating of the aircraft in the transitional take-off phase.

FIG. 2 represents the distribution of the weighting of the measurements of the positions (LOC_SOL, LOC_VOL) of the aircraft by the ground locating system and by the in-flight locating system during the take-off phase.

The weighting of the measurements in the method according to the invention is different depending on whether the aircraft is in one of the three distinct phases represented: acceleration, take-off or the transition phase and a final flight phase, denoted stabilization phase.

The position of the aircraft, throughout the acceleration phase, is contained in the part 20 of the curve between the take-off point, represented by the origin of the graph, and the point where the aircraft leaves the runway, represented by the point A0.

A third step of the method, following the acceleration of the aircraft, comprises the calculation of at least one position between the point A0 where the aircraft leaves the runway and a threshold point As from which the position of the aircraft is entirely measured based on the in-flight locating system.

FIG. 2 represents, in the part 21 of the curve between the point A0 and the point AS, a linear hybridization between the measurement of the position of the aircraft by the ground locating system and the measurement of the position by the in-flight locating system.

The method according to the invention makes it possible to have several indicators to determine the point A0. This final point can be determined after the rotation of the aircraft, involving a crossed altitude condition above the take-off runway or even by an indicator of the overshooting of a pressure threshold on the landing gears. As an example, the altitude condition of the point A0 can be obtained for an altitude threshold above the runway of 10 feet.

The point AS is considered as a threshold position that no longer requires the accuracy of the ground locating system. This final position can be determined in several ways depending on the embodiments. The altitude condition of the point AS can be obtained for a predetermined altitude threshold above the ground; it could for example be 50 feet.

In another embodiment, the point AS can be determined by a condition of a crossed rolling threshold, that is, after the aircraft has performed a turn.

A variant embodiment of the invention makes it possible to determine the point AS from a delay corresponding to a predetermined time after throttling-up.

During this transition phase following take-off, when the aircraft has left the runway, the invention proposes to measure, in this step, the position of the aircraft by a weighting expressed as a percentage of a first position, denoted PCT ROU, determined on the basis of the ground locating system and a second position, denoted PCT VOL, determined on the basis of the in-flight locating system.

This weighting can be a function of the altitude, of the speed or of the roll of the aircraft or even a combination of these data. The weighting can also be carried out for predetermined period of time, for example from the moment of throttling-up.

The curve linking the two positions deriving from their respective locating system may be linear or indeed non-linear.

In the latter case, it may be a curve of the second degree or logarithmic for example, or even any other basic function.

An exemplary implementation of hybridization based on a weighting of the location of the aircraft according to the positions of each locating system makes it possible to equally determine the latitude, denoted Lat(aeroplane), and the longitude, denoted Long(aeroplane), of the aircraft by the following relations:

LAT(aeroplane)=[PCT_VOL*LAT_VOL]+[(100%−PCT_VOL)*LAT_ROU];

in which the latitude calculated on the basis of the ground locating system is denoted LAT_ROU and the latitude calculated on the basis of the in-flight locating system is denoted LAT_VOL; and LONG(aeroplane)=[PCT_VOL*LONG_VOL]+[(100%−PCT_VOL)*LONG_ROU];

in which the longitude calculated on the basis of the ground locating system is denoted LONG_ROU and the longitude calculated on the basis of the in-flight locating system is denoted LONG_VOL.

FIG. 2 represents a linear slope between A0 and AS where the hybridization of the positions LOC_SOL and LOC_VOL is performed according to the altitude. The percentages PCT_VOL and PCT_ROU corresponding to the hybridization of the positions deriving from the in-flight and ground locating systems are therefore functions of the altitude.

In the example, the relation, linking the positions LOC_SOL and LOC_VOL with the altitude, is linear between the points A0 and AS. ALT(aeroplane) represents the instantaneous altitude of the aircraft and ALT(AS) represents the altitude at the point AS.

The relations then become:

$$\mathrm{LAT(Aeroplane)} = \frac{ALT(AS) - ALT(\mathrm{aeroplane})}{ALT(AS)} \cdot \mathrm{LAT\_ROU} + \frac{ALT(\mathrm{aeroplane})}{ALT(AS)} \cdot \mathrm{LAT\_VOL}$$

$$\mathrm{LONG(Aeroplane)} = \frac{ALT(AS) - ALT(\mathrm{aeroplane})}{ALT(AS)} \cdot \mathrm{LONG\_ROU} + \frac{ALT(\mathrm{aeroplane})}{ALT(AS)} \cdot \mathrm{LONG\_VOL}$$

in which the latitude calculated on the basis of the ground locating system is denoted LAT_ROU and the latitude calculated on the basis of the in-flight locating system is denoted LAT_VOL; and In which the longitude calculated on the basis of the ground locating system is denoted LONG_ROU and the longitude calculated on the basis of the in-flight locating system is denoted LONG_VOL.

In this final example, after the passage at the point AS, the altitude, called "threshold altitude", the calculation of the position of the aircraft is performed solely by the in-flight locating system.

The following then apply: PCT_ROU=0% and PCT_VOL=100%.

In another embodiment, the percentages PCT_VOL and PCT_ROU corresponding to the hybridization of the positions deriving from the in-flight and ground locating systems are functions of time. T(aeroplane) is used to denote the local time of the aircraft expressed in seconds, Ts the planned time at which the aircraft uses only its in-flight locating system corresponding to the point AS, and T0 the time, expressed in seconds, at which the aircraft leaves the runway, this point corresponding to the point A0 in FIG. 2.

The relations then become:

LAT(Aeroplane) =
$$\frac{Ts - T(\text{aeroplane})}{Ts - T0} \cdot \text{LAT\_ROU} + \frac{T(\text{aeroplane}) - T0}{Ts - T0} \cdot \text{LAT\_VOL}$$

LONG(Aeroplane) =
$$\frac{Ts - T(\text{aeroplane})}{Ts - T0} \cdot \text{LONG\_ROU} + \frac{T(\text{aeroplane}) - T0}{Ts - T0} \cdot \text{LONG\_VOL}$$

When the time Ts has elapsed, the position of the aircraft uses 100% of the position deriving from the in-flight locating system.

A second method makes it possible to calculate, on the basis of a hybridization similar to that used on take-off, the position of the aircraft when the latter is in the approach phase. An altitude, time or flying mode threshold condition, for example on final levelling-off, makes it possible to determine a hybrid calculation mode.

Until the condition is reached, that is, the aircraft is in cruising flight mode and upstream of the final approach phase, the position of the aircraft is entirely determined on the basis of the in-flight locating system.

In the final transitional approach phase, a hybridization of the calculation of the position of the aircraft between the position deriving from the in-flight locating system and from the ground locating system can be determined as a function of the altitude.

The relations are as follows:

LAT(Aeroplane) =
$$\frac{ALT(\text{aeroplane}) - ALT(AS)}{ALT(AS)} \cdot \text{LAT\_ROU} + \frac{ALT(\text{aeroplane})}{ALT(AS)} \cdot \text{LAT\_VOL}$$

LONG(Aeroplane) = $\frac{ALT(\text{aeroplane}) - ALT(AS)}{ALT(AS)} \cdot \text{LONG\_ROU} +$
$$\frac{ALT(\text{aeroplane})}{ALT(AS)} \cdot \text{LONG\_VOL}$$

In the same way as in the take-off phase, a variant embodiment makes it possible to implement a method in which the hybridization of the position of the aircraft is a function of time.

Finally, when the aircraft makes contact with the runway, this condition being determined by a measurement of the altitude or of a pressure of the landing gears for example, the position of the aircraft is then entirely determined on the basis of the ground locating system, as well as during the rolling phases preceding the landing.

Figure 3:
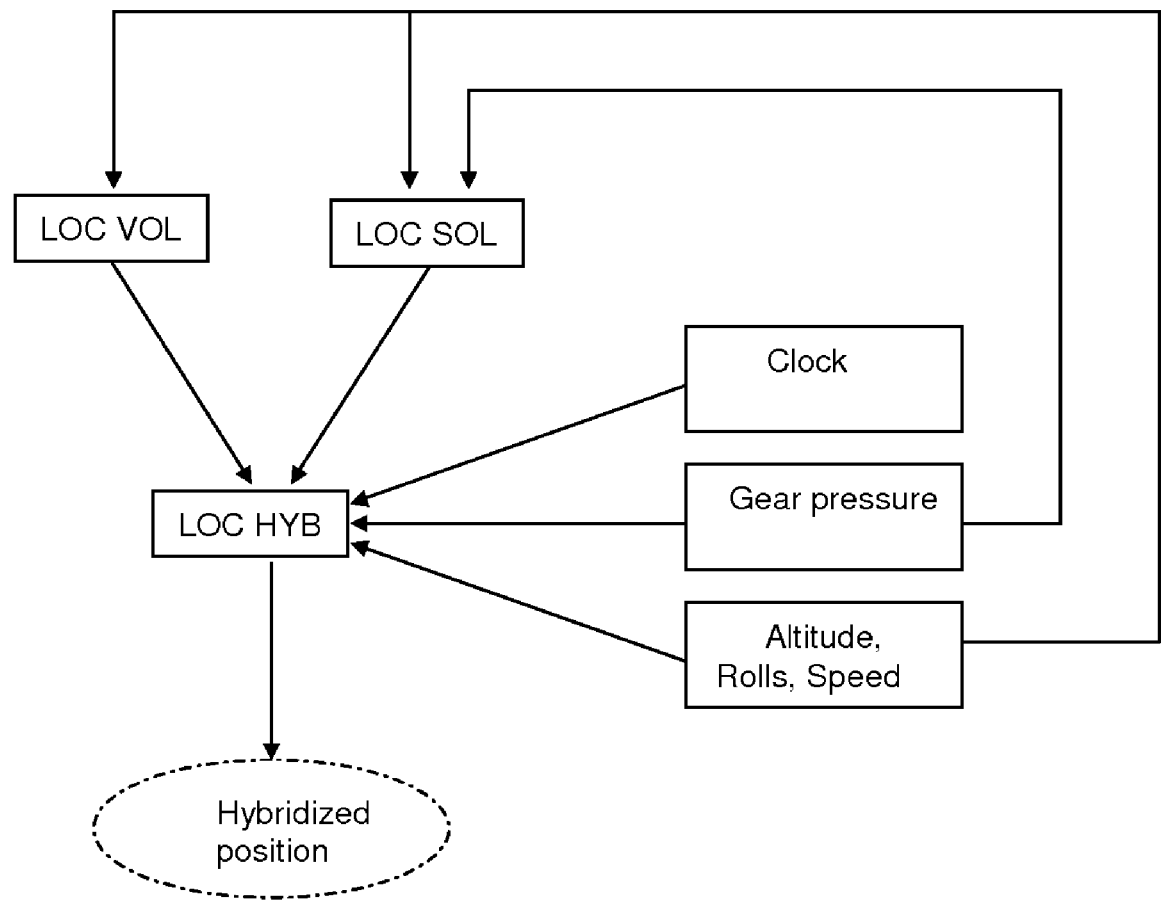
FIG. 3: the diagram of the data used to hybridize the locating of the aircraft.

FIG. 3 represents the principle of hybridization of the position of the aircraft based on the data obtained from the aircraft computer. LOC VOL represents the position deriving from the in-flight locating system, LOC SOL represents the position deriving from the ground locating system. The hybridization between the two measured positions is checked and performed on the basis of the data associated with the context of the aircraft: the time determined by the computer clock, the pressure of the landing gear by sensors positioned on the aircraft, the altitude, the roll and the speed determined on the basis of the aircraft's onboard computer. The computer is then capable of determining a hybridized position in the take-off and approach phases.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of locating an aircraft, the aircraft comprising an in-flight locating system and a ground locating system, the method comprising:
during a transition phase defined between (1) a first phase being a condition of contact between the aircraft and a runway and (2) a second phase being a threshold condition defining a stabilized flight phase,
determining a ground position using the ground locating system;
determining a flight position using the in-flight locating system; and
determining a transition position of the aircraft by a weighting between the ground position and the flight position;
during the first phase, omitting the flight position; and
during the second phase, omitting the ground position.

2. The method according to claim 1, further comprising:
prior to the transition phase, calculating a threshold position of the aircraft, beyond which the position of the aircraft is calculated in a hybrid manner; and
after the transition phase, when the aircraft is in contact with the runway, calculating the ground position of the aircraft by the ground locating system.

3. The method according to claim 1, wherein the first phase is triggered by a change of altitude of the aircraft.

4. The method according to claim 1, wherein the first phase is triggered by a change of pressure on the aircraft landing gears.

5. The method according to claim 1, wherein the threshold condition is validated by a crossed altitude threshold.

6. The method according to claim 1, wherein the threshold condition is validated by a crossed rolling threshold.

7. The method according to claim 1, wherein the threshold condition is validated by a predetermined duration.

8. A method of locating an aircraft, the aircraft comprising an in-flight locating system and a ground locating system, the method comprising:
during a transition phase defined between (1) a first phase being a condition of contact between the aircraft and a runway and (2) a second phase being a threshold condition defining a stabilized flight phase,
determining a ground position using the ground locating system;
determining a flight position using the in-flight locating system; and
determining a transition position of the aircraft by a weighting between the ground position and the flight position,
wherein the method further comprising:
at a moment of throttle-up, determining a starting position of the aircraft by an onboard computer;
prior to the transition phase, when the aircraft accelerates, calculating ground position of the aircraft by the ground locating system;
after the transition phase step, calculating the flight position of the aircraft by the in-flight locating system.

9. The method according to claim 8, wherein the method further comprising:

automatically realigning the starting position in the onboard computer based on a calculation of the difference measured between a designated take-off point and an actual position of the aircraft obtained, just before throttle-up, by the ground locating system.

10. The method according to claim 9, further comprising: designating, in the onboard computer, an take-off position of the aircraft based on an airport database, the designation being produced in the preparation of the flight by a crew of the aircraft.

11. The method according to claim 8, wherein the first phase is triggered by a change of altitude of the aircraft.

12. The method according to claim 8, wherein the first phase is triggered by a change of pressure on the aircraft landing gears.

13. The method according to claim 8, wherein the threshold condition is validated by a crossed altitude threshold.

14. A method of locating an aircraft, the aircraft comprising an in-flight locating system and a ground locating system, the method comprising:
during a transition phase defined between (1) a first phase being a condition of contact between the aircraft and a runway and (2) a second phase being a threshold condition defining a stabilized flight phase,
determining a ground position using the ground locating system;
determining a flight position using the in-flight locating system; and
determining a transition position of the aircraft by a weighting between the ground position and the flight position,
wherein a transition position in the transition phase is calculated on the basis of a percentage of the ground position and a percentage of the flight position.

15. The method according to claim 14, wherein a latitude of the aircraft, denoted as "Lat (aircraft)," in the transition phase, is determined by the relation:

Lat(aircraft)=[PCT_VOL*Lat_VOL]+[(100−PCT_VOL)*Lat_ROU], in which a latitude calculated on the basis of the ground locating system is denoted Lat_ROU and a latitude calculated on the basis of the in-flight locating system is denoted Lat_VOL and in which PCT_VOL represents the percentage of the weighting of the position obtained from the in-flight locating system.

16. The method according to claim 14, wherein a longitude of the aircraft, denoted as "Long (aircraft)," in the transition phase, is determined by the relation:

Long(aircraft)=[PCT_VOL*Long_VOL]+[(100−PCT_VOL)*Long_ROU], in which a longitude calculated on the basis of the ground locating system is denoted Long_ROU and a latitude calculated on the basis of the in-flight locating system is denoted Long_VOL, and in which PCT_VOL represents the percentage of the weighting of the position obtained from the in-flight locating system.

17. The method according to claim 14, wherein the percentage of the ground position and the percentage of the flight position are determined on the basis of an altitude-dependent linear relation.

18. The method according to claim 17, wherein a latitude LAT(Aeroplane) and a longitude LONG(Aeroplane) of a current position of the aircraft are determined by the following relations:

$$\text{LAT(Aeroplane)} = \frac{ALT(AS) - ALT(\text{aeroplane})}{ALT(AS)} \cdot \text{LAT\_ROU} + \frac{ALT(\text{aeroplane})}{ALT(AS)} \cdot \text{LAT\_VOL}$$

$$\text{LONG(Aeroplane)} = \frac{ALT(AS) - ALT(\text{aeroplane})}{ALT(AS)} \cdot \text{LONG\_ROU} + \frac{ALT(\text{aeroplane})}{ALT(AS)} \cdot \text{LONG\_VOL}$$

in which ALT(AS) is an altitude at a point from which a position of the aircraft is calculated entirely on the basis of the in-flight locating system and LAT(aeroplane) is a current altitude of the aircraft.

19. The method according to claim 14, wherein the percentage of the first position and the percentage of the second position are determined on the basis of a time-dependent linear relation.

20. The method according to claim 19, wherein a latitude LAT(Aeroplane) and a longitude LONG(Aeroplane) of a current position of the aircraft are determined by the following relations:

$$\text{LAT(Aeroplane)} = \frac{Ts - T(\text{aeroplane})}{Ts - T0} \cdot \text{LAT\_ROU} + \frac{T(\text{aeroplane}) - T0}{Ts - T0} \cdot \text{LAT\_VOL}$$

$$\text{LONG(Aeroplane)} = \frac{Ts - T(\text{aeroplane})}{Ts - T0} \cdot \text{LONG\_ROU} + \frac{T(\text{aeroplane}) - T0}{Ts - T0} \cdot \text{LONG\_VOL}$$

in which Ts is a time of passage at a point from which a position of the aircraft is entirely calculated on the basis of the in-flight locating system, T0 is the time of passage when the aircraft leaves the runway and T(aeroplane) is a local time of the aircraft.

* * * * *